United States Patent [19]

Wennerstrom

[11] 4,049,349

[45] Sept. 20, 1977

[54] DEVICE FOR MEASURING ROTOR TIP CLEARANCE IN OPERATING TURBOMACHINERY

[76] Inventor: Arthur J. Wennerstrom, 215 Mar-Ken Drive, Dayton, Ohio 45405

[21] Appl. No.: 701,453

[22] Filed: June 30, 1976

[51] Int. Cl.² .......................... G01C 3/08; G01P 3/48
[52] U.S. Cl. .................................... 356/4; 73/117.3; 250/561; 324/171; 356/1
[58] Field of Search ............................ 356/1, 4, 5, 28; 324/171; 250/561; 73/117.2, 117.3

[56] References Cited

U.S. PATENT DOCUMENTS

| | | | |
|---|---|---|---|
| 2,960,908 | 11/1960 | Willits et al. | 356/28 |
| 3,002,420 | 10/1961 | Willits et al. | 356/1 |
| 3,771,873 | 11/1973 | Tourret | 356/4 |
| 3,856,410 | 12/1974 | Swift et al. | 250/560 |
| 3,865,305 | 2/1975 | Sampey | 324/171 |

Primary Examiner—S. C. Buczinski
Attorney, Agent, or Firm—Joseph E. Rusz; Robert Kern Duncan

[57] ABSTRACT

A direct digital measurement proportional to tip clearance of the blades of a turbomachine is obtained by placing at each position on the casing where clearance is to be measured a pair of optical sensors. Each sensor comprises the ends of fiber-optic bundles communicating with a remotely positioned light emitter and a light detector. The sensors in the casing are spaced a short distance apart in the circumferential direction but both located at the same axial coordinate with respect to the axis of rotation. The two sensors each emit a beam of light at an angle to one another measured in a surface of revolution containing both light beams. The light reflected and scattered by a blade passing each beam is transmitted back through the adjacent or concentric fiber optics to photodiode detectors. A signal generator producing a stable frequency of pulses in the megacycle range provides the digital time base. As a rotating blade intercepts the first light beam of the sensor pair, the signal from its photodiode starts a counter which counts cycles (pulses) from the signal generator. As the blade in its movement intercepts the second light beam, the signal from its photodiode stops the counter. Another similar (single) sensor, monitoring a point relative to the turbomachine disc or shaft, starts and stops another counter which records the number of cycles or pulses which occurred during one revolution of the shaft. By dividing the number of counts measured by the sensor pair by the number of counts measured during one shaft revolution, a number is obtained which is insensitive to rotational speed and since the light beams of the sensor pairs are at an angle to one another, this number varies linearly with respect to tip clearance.

1 Claim, 3 Drawing Figures

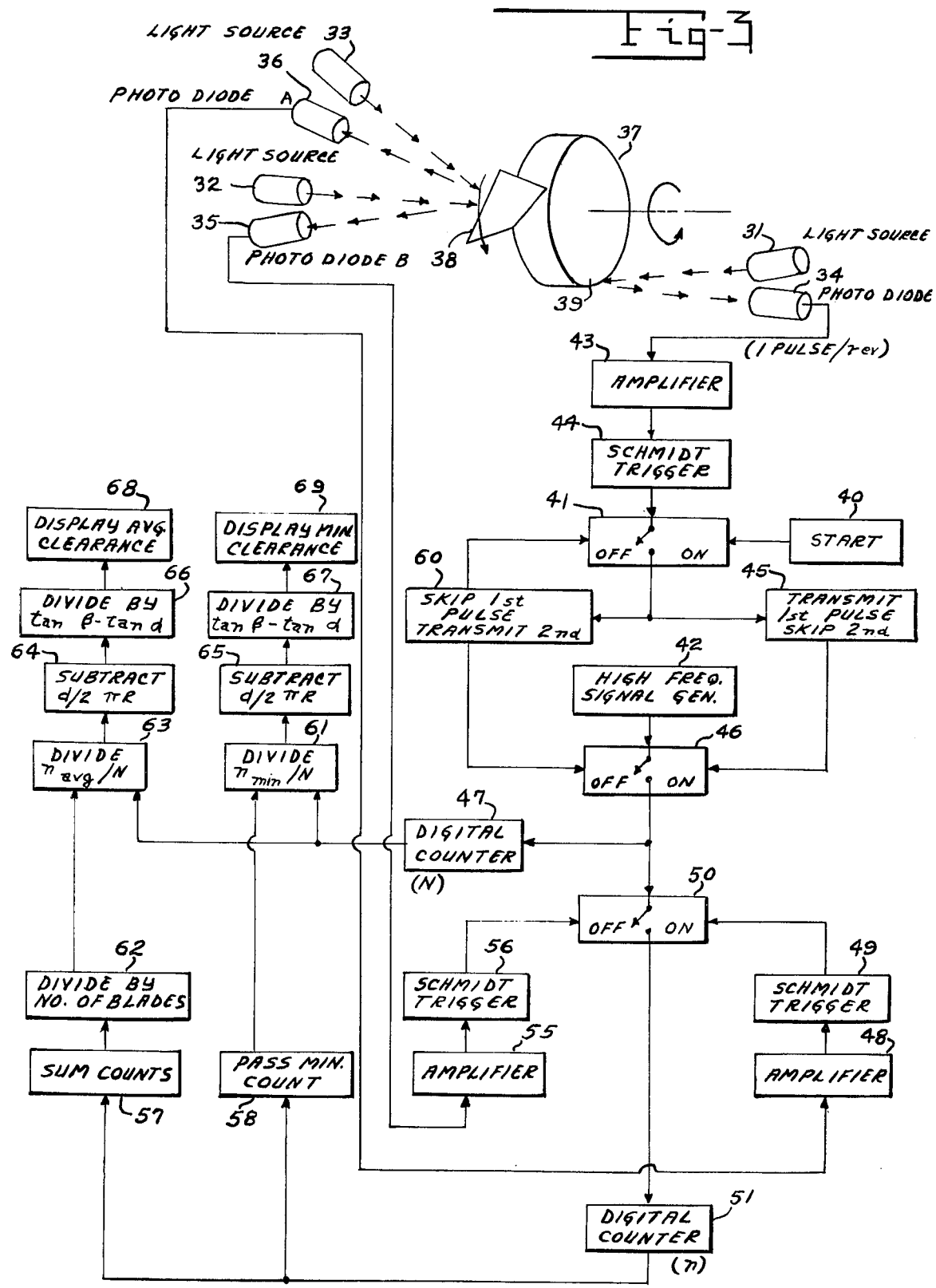

4,049,349

DEVICE FOR MEASURING ROTOR TIP CLEARANCE IN OPERATING TURBOMACHINERY

RIGHTS OF THE GOVERNMENT

The invention described herein may be manufactured and used by or for the Government of the United States for all governmental purposes without the payment of any royalty.

BACKGROUND OF THE INVENTION

The field of the invention is in the art of electronic measurement of small distances, and particularly in the art of measuring the clearances of the tips of turbomachine blades.

Knowledge of the tip clearance existing during actual operation of a turbomachine is vitally important both from the standpoint of mechanical integrity and also for the thermodynamic performance of the machine. It has previously been measured with eddycurrent devices, by capacitance probes, and more recently by optical means. However, all of these systems have depended upon an analog signal subject to one or more forms of considerable error. The following patents may be of value in adding to the background of the invention; U.S. Pat. No. 3,614,617 to patentee Blake; U.S. Pat. No. 3,856,410 to patentee Swift and U.S. Pat. No. 3,908,444 to patentee Peter.

SUMMARY OF THE INVENTION

A direct digital electro-optical measurement system using two light beams and associated sensing units positioned at an angle to one another in the wall of a turbomachine casing, and aimed so that the light is intercepted by passing blades, provide an indication of the distance from the casing wall to the blade tips that is independent of the rotational speed when the time between beam intercepts is referenced to the time of one revolution.

BRIEF DESCRIPTION OF THE DRAWING

FIG. 3 represents in block-schematic form an embodiment of the invention.

DESCRIPTION OF THE PREFERRED EMBODIMENT

Figure 1:
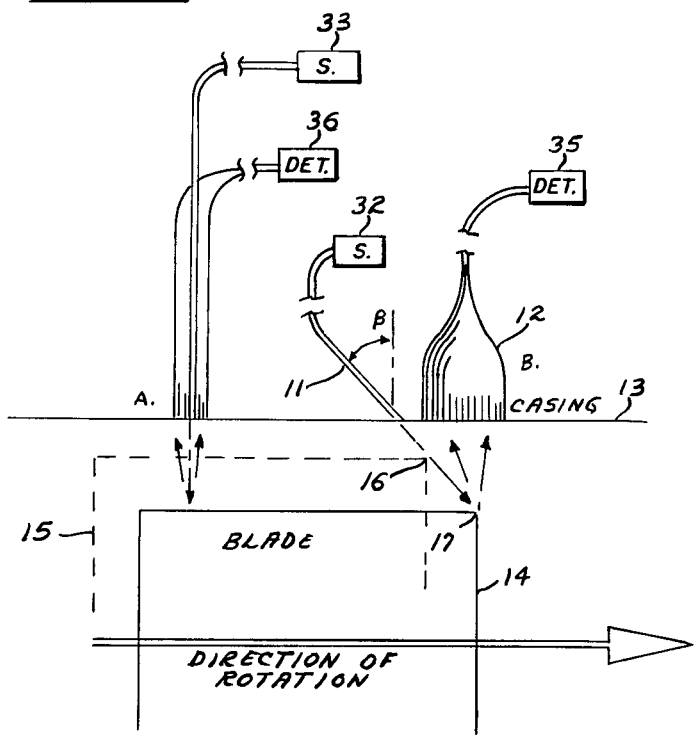
FIG. 1 schematically illustrates a typical photosensor placement in the casing wall showing the reflections from a passing blade tip.

Generally, for installation convenience as well as for temperature and vibration isolation of the light source and photodiodes, fiber optic bundles a few feet in length are used to transmit light from the light source to the turbomachine casing and back to the photodiodes. It is preferable to employ different fibers for transmitting and receiving light, although the same fibers could be used in conjunction with an optical beamsplitter if desired. The fiber optics are preferably arranged at each clearance measurement location as shown in FIG. 1. At location A in FIG. 1, the fibers are arranged concentrically although this is not necessary. At location B in FIG. 1, light emitting bundle 11 lies at an angle $\beta$ from the radial direction and light receiving fibers 12 are arranged in a thin rectangle normal to the casing although other configurations, e.g., a circle, are equally feasible. The detector 12 should be circumferentially located as close as mechanically feasible to the emitting fiber, removed from it in the direction of rotation, and preferably having a circumferential dimension between 1.0 and 2.0 times the maximum value of $b$ (FIG. 2) anticipated for a given installation. As a turbomachine blade enters the light beam at location A, the reflected and scattered light is sensed by the photodiode corresponding to location A. The output from the photodiode, acting through a Schmidt Trigger or similar circuit, starts a counter. This counter counts cycles or pulses generated by a stable frequency source such as a quartz oscillator. As the same blade enters the light beam corresponding to location B, the photodiode corresponding to that location senses the reflected and scattered light and, again acting through a Schmidt Trigger or similar control pulse generator, stops the counter. An arrangement similar to that at location A is arranged to sense a marker solidly attached to the turbomachine shaft; for example, a point on the disc supporting the rotating blades. This starts and stops a separate counter recording the number of cycles or pulses generated by the same frequency source during one revolution. It can readily be seen that if blade 14 were in position 15 as indicated by the dotted lines, (and with reduced clearance as shown), that the movement of the blade between intercepting lights A and B would be much less with return reflections from B commencing with blade edge at position 16 instead of position 17.

Figure 2:
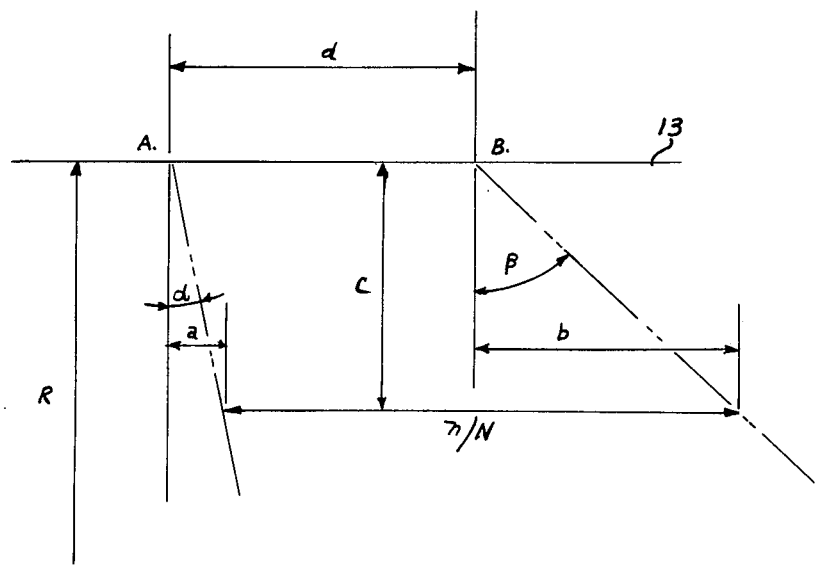
FIG. 2 schematically illustrates geometrically the angular and spacing relationship shown in physical representation in FIG. 1.

This information is converted to a tip clearance measurement in the following manner. The nomenclature below is illustrated in FIG. 2. It has been assumed that tip clearance will always be small with respect to the radius of the rotor. Hence, casing wall 13 is shown as a straight line in FIGS. 1 and 2 and the mathematics has been correspondingly simplified.

$d$ = Circumferential distance between light emitters at locations A and B. It is preferable that it be as small as installation considerations permit but it must be large enough so that light scattered from beam A is not sensed by the photodiode corresponding to location B and vice versa.

$R$ = casing or rotor, including blade radius. (For practical purposes, they are the same.)

$C$ = clearance to be measured.

$\alpha$ = the angle which the light beam at location A makes with a line intersecting the turbomachine axis.

$\beta$ = the angle which the light beam at location B makes with a line intersecting the turbomachine axis. The line intersecting the axis need not be perpendicular to it but must have the same inclination to the axis as the same reference line at location A such that they both lie in the same cone of revolution.

$n$ = the number of cycles counted by a counter as a blade passes from light beam A to light beam B.

$N$ = the number of cycles counted by a counter as the rotor makes one complete revolution.

$a, b$ = distances illustrated in FIG. 2 corresponding to locations A and B respectively.

At zero clearance, one can write $$\frac{d}{2\pi R} = \left(\frac{n}{N}\right) \text{ zero clearance.} \quad (1)$$

The above fractions simply represent the ratio of the distance between sensor locations A and B and the circumference of the rotor. From FIG. 2, one can write the trigonometric relations.

$$a = C \tan \alpha \quad (2)$$

$$b = C \tan \beta \quad (3)$$

The ratio $n/N$ at some finite clearance C is therefore $$\frac{n}{N} = \left(\frac{n}{N}\right) \text{zero clearance} - a + b \quad (4)$$

Combining equations (1), (2), (3) and (4), one obtains $$C = \frac{\frac{n}{N} - \frac{d}{2\pi R}}{\tan \beta - \tan \alpha} \quad (5)$$

If for any reason it is not practical to rely on the accuracy of the dimension $d$, one can obtain a measure of $n/N$ at low speed and equate this to a clearance measured with feeler gauges or a micrometer with the machinery at rest. Then a running clearance can be obtained from the following difference measurement.

$$C = C_{static} - \frac{\left(\frac{n}{N}\right) \text{slow roll} - \frac{n}{N}}{\tan \beta - \tan \alpha} \quad (6)$$

The choice of whether to use equation (5) or (6) to obtain clearance depends upon a number of factors. For example, with rolling contact rotor support bearings, equation (6) might prove more accurate. However, with journal bearings, the rotor would occupy a new position relative to the housing axis as soon as the machine began operating and, unless $C_{static}$ was actually measured under low speed rotating conditions, equation (5) would probably be more accurate. The choice of angles $\alpha$ and $\beta$ is not critical and somewhat open as long as they are not nearly equal. However, values of $\alpha = 0°$ and $\beta = 45°$ are recommended as a good compromise between simplicity and accuracy. Note that it is preferable for the direction of rotation to correspond to the directions of $\alpha$ and $\beta$ shown in FIG. 2 so that the rotating blade encounters the light beam sharply. By constructing the apparatus such that $\alpha = 0°$ and $\beta = 45°$, Tan $\alpha$ becomes zero and Tan $\beta$ becomes 1 so that the clearance $$C = \frac{n}{N} - \frac{d}{2\pi R}.$$

The numbers concerning response time and the frequency of the oscillator depend upon the measurement accuracy required and the tip speed of the moving blades. Assume a desired accuracy in clearance measurement of ± 0.001 inch or better at tip speeds up to 1800 ft/sec. Further, assume that each element of the system should have a precision equivalent to at least twice the clearance tolerance. At 1800 ft/sec, a blade will move 0.0005 inches in 23 × 10⁻⁹ seconds relative to the adjacent casing. Therefore, all elements of the system should respond in a time interval less than 23 nanoseconds. Also, allowing an error of plus or minus one cycle in frequency counting, the minimum oscillator frequency consistent with this is the reciprocal of 23 nanoseconds or 43.5 megacycles. These numbers are within reach of present day solid state electronic sensing, switching, and counting components.

By adding some additional logic to the fundamental system just disclosed one can obtain an average clearance, of interest for aerodynamic purposes, and a minimum clearance measurement, important for mechanical reasons. The average clearance during one rotor revolution is obtained by taking the cumulative total of counts, $n$, recorded as each blade passed the sensor pair during one revolution. This number is then divided by N times the number of blades in the rotor to obtain an average ($n/N$). The minimum (or maximum) clearance is obtained by storing the number of counts, $n$, produced by each individual blade in a separate register; then examining all of the recorded values and using the minimum value to compute minimum (or maximum for maximum), clearance. Another common way of selecting a minimum count is to program a register to compare a stored number with a present number and store the lesser one. Successive comparisons are then made of a sequence of numbers. This total electronic package could be duplicated for each sensor location on the turbomachine casing or might be multiplexed such that the same counters and associated logic examine multiple channels in sequence. For most applications, updating the display for all channels once every few seconds is adequate to monitor steady-state clearance changes.

A block-schematic diagram of a typical embodiment of the invention that provides two numerical readouts, one displaying the average blade clearance and the other the minimum blade clearance of a particular rotor of a turbomachine, is shown in FIG. 3. Conventional light sources 31, 32, and 33 and conventional photodiode light detectors 34, 35, and 36 are located on a separate structure a few feet remote from the turbomachine having rotor 37. The optical signals are conveyed to the moving elements, i.e., the rotor and the blades, by conventional fiber optic bundles having ends terminating at the inside surface of the casing wall in a conventional manner. Only one blade, 38, is illustrated. The reference mark 39 to provide one signal per revolution is typically a spot of highly reflective paint positioned at an appropriate point on the rotor. The arrangement of the ends of the fiber optic sensors are as illustrated and described in connection with FIGS. 1 and 2.

The following briefly describes the operation of the typical embodiment shown in FIG. 3. With the turbomachine operating under the conditions in which the blade clearance is desired, start circuit 40 is manually energized in the conventional manner by pressing the start button. This turns switch 41 "on" and energizes the electronic circuits, including light sources 31, 32, and 33 and turns on high frequency signal generator 42. The first time marker 39 returns reflected light to photodiode 34 after start 40 is actuated, a signal from diode 34 is amplified by amplifier 43 and initiates a trigger control pulse to be generated in trigger generator 44. This trigger pulse flows through closed switch 41 and control circuit 45 and turns on switch 46. With switch 46 "on" pulses from high frequency signal generator 42 start being counted in digital counter 47. The first blade, 38, to pass into sensor area A after start 40 is activated, produces a signal output from detector 36 which is amplified by amplifier 48 and a control trigger pulse provided by trigger generator 49 which turns on switch 50. With switch 50 closed, pulses from the high frequency generator 42 enter counter 51 and a count is commenced. As rotor blade 38 moves slightly forward, light from source 32 is reflected to detector 35 and it provides an output which is amplified in amplifier 55 producing a trigger pulse in trigger generator 56 which turns off switch 50 stopping the count in counter 51. This count is stored in sum counter 57 and in pass minimum counter 58. The next blade (not illustrated) on the turbomachine rotor, 37, enters the light beam from light source 33 and light is reflected to photodetector 36 turning switch 50 back on and providing a new count in counter 51 which continues until this blade reflects light from source 32 back to detector 35. This turns off switch 50 stopping the count in counter 51. This count is added to the previous count in sum counter 57. If this new count is smaller than the previous one stored in pass minimum counter 58, the former count is discarded and the new (lower) count is stored in pass minimum counter 58. If the former count stored in counter 58 was smaller, it is held and the present (larger) count is ignored. The following counts from each blade are similarly compared and the smallest count always stored (and passed) in the pass minimum counter 58.

The foregoing operation is continued for each blade on the rotor until marker 39 returns a signal to photodiode detector 34 at the end of the revolution. At this time (which is the second signal from detector 34 after initiating start control 40) controller 60 passes this (the second) pulse to switches 41 and 46 turning them off. This stops the count in counter 47 which has now totaled the counts (N) from signal generator 42 for one revolution of the rotor. The passage of the last blade before the marker pulse entered the light from source 31, turned off switch 50, registering the count for that blade in counter 51 which was summed in counter 59. The smallest count for all the blades is now in pass minimum counter 58 and passed to divider 61. The sum of the counts for all the blades in counter 57 is divided by the number of blades on the particular rotor being examined (a factor manually set into divider 62) which provides an average value of $n$. This average value of $n$ is divided by N the total counts per revolution in divider 63. It can readily be seen the ratios obtained in dividers 61 and 63 are completely independent of the rotational speed of the rotor (except for vibrational, resonant, rotor orbiting, and other substantially second order effects.

The mathematics (as previously set forth in equation (5)) of subtracting $d/2\pi R$ from the ratios of $n$ avg/N and $n$ min/N is performed by subtractors 64 and 65 and the results divided by Tan $\beta$ − Tan $\alpha$ by dividers 66 and 67 providing a digital figure that is the average blade clearance and the minimum blade clearance, respectively, for the rotor. These figures are numerically displayed by numerical readout displays 68 and 69, respectively. As previously mentioned, if $\alpha$ is constructed to be 0° and $\beta$ constructed to be 45°, dividers 66 and 67 are not needed.

All of the components and elements shown and represented in FIG. 3 are conventional and well known individual devices. The individual devices performing the operations of adding, subtracting, dividing, etc., are well known. Solid state digital devices for performing these operations are common, well known, and generally preferred for the construction of embodiments of the invention. Typical embodiments of the invention may conventionally be constructed with microprocessors performing the mathematical, storing, comparing, switching, and other functions illustrated in FIG. 3 with conventional solid state numerical displays providing the numerical clearances in thousandths of inches or other appropriate values.

I claim:
1. Apparatus for measuring in an operating turbomachine clearance between a casing and blade tips of a revolving rotor having a circumferential direction and an axis of rotation, the said casing having a radius R from the said axis, the said apparatus comprising:
   a. a pair of sensors comprising a first light source emitting a beam of light cooperating with a first light detector, and a second light source emitting a beam of light cooperating with a second light detector;
   b. the said pair of sensors positioned circumferentially in spaced-apart relationship in the said casing where the said blade clearance is to be measured, and having equal axial coordinates with respect to the said axis of rotation, and the said light emitting sources angled to one another measured in a plane of revolution of said rotor containing both light beams and separated by a determined distance $d$;
   c. means for detecting a revolution of the said revolving rotor;
   d. a high frequency generator providing a stable frequency of pulses;
   e. means cooperating with the said pair of sensors and the said high frequency generator providing a digital count $n$ of pulses between the intercept of a blade with the said first light beam and the intercept of the blade with the said second light beam;
   f. means cooperating with the said means for detecting a revolution of the revolving rotor and the said high frequency generator providing a digital count N of pulses occurring during the said revolution;
   g. means for dividing the said $n$ count by the said N count and providing a quotient of $n/N$;
   h. means for subtracting from the quotient $n/N$ the distance $d$ divided by $2\pi$ times the said casing radius R and providing a digital output; and
   i. means for displaying the said digital output.

* * * * *